United States Patent Office 3,100,859
Patented Aug. 13, 1963

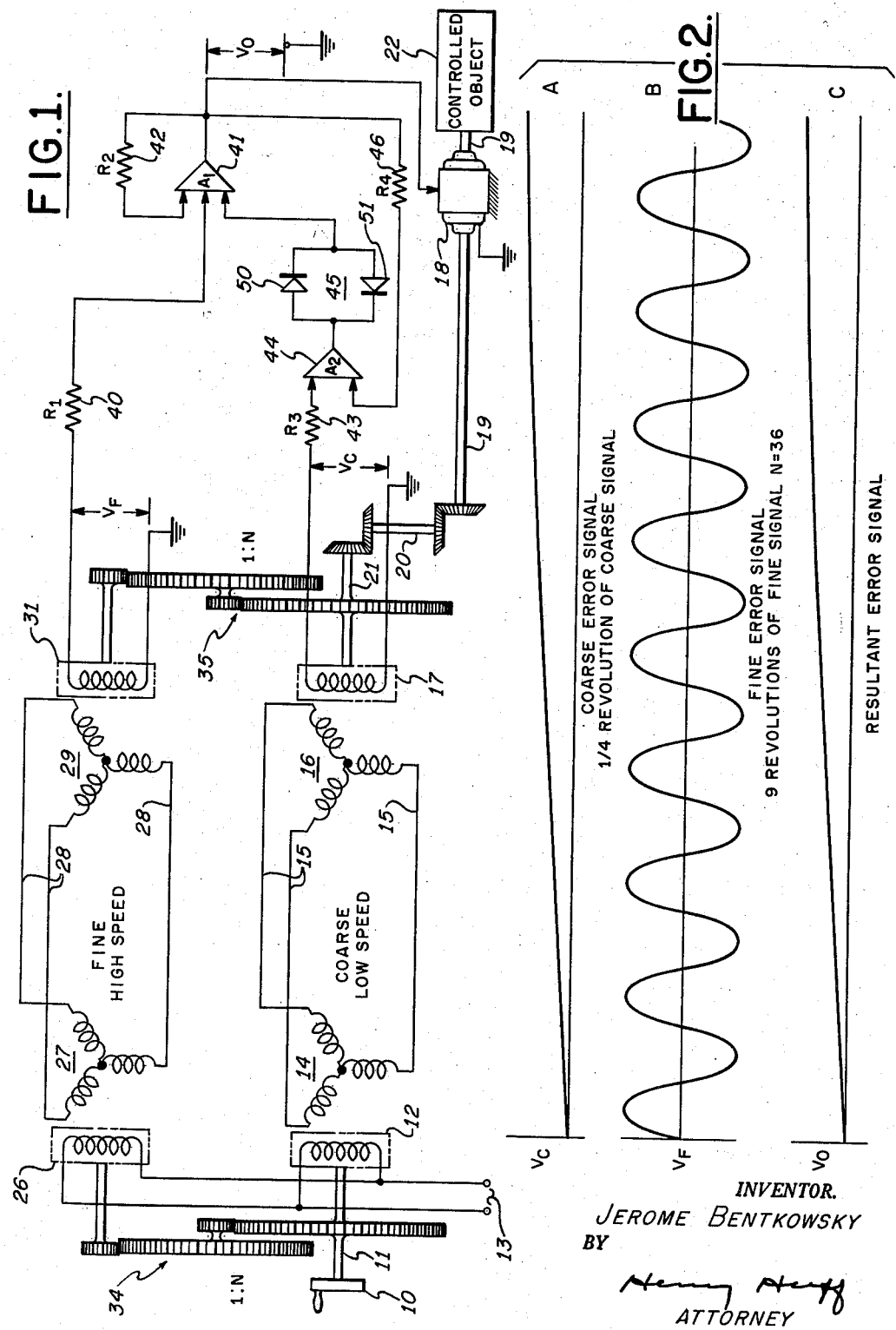

3,100,859
FINE AND COARSE SIGNAL MIXING CIRCUIT
Jerome Bentkowsky, Charlottesville, Va., assignor to Sperry Rand Corporation, Great Neck, N.Y., a corporation of Delaware
Filed May 29, 1961, Ser. No. 113,418
5 Claims. (Cl. 318—30)

This invention relates to signal mixing circuits and in particular to signal mixing circuits especially adapted for use in a servo system wherein fine and coarse error signals are employed in the control of a servomotor.

More particularly, the present invention relates to servo systems in which a fine and coarse signal voltage mixing circuit is provided having an output for accurately controlling the servomotor with respect to a controlling device, the mixing circuit including means for effectively transferring control of the output from the fine input to the coarse input when a disagreement exceeding a predetermined amount exists between the position of the controlled object driven by the servomotor and the position of the controlling device.

The present invention is an improvement over the apparatus shown in U.S. Patent 2,614,237, issued October 14, 1952, to R. C. Goertz, entitled Signal Mixing Circuits. In a system of the type shown in the aforementioned U.S. patent, the circuit exhibits a very high signal gradient for small signals (essentially the gradient of the signal from the fine or high speed synchro) and a lower gradient for large signals (essentially the gradient of the signal from the coarse or low speed synchro). While this output signal is satisfactory for certain types of positional servo systems, there are applications where greater accuracy is required. Particularly for computation purposes, the output must essentially resemble the signal from the low speed synchro. In applications of this type, it is also highly desirable that the output signal be linear and that the transition from one type of input signal to another be accomplished smoothly. Further, it is desirable that the circuit which accomplishes this result be as simple and reliable as possible and of the type which does not require that its characteristics be precisely matched to the characteristics of other portions of the circuits.

It is a primary object of the present invention to provide an electrical circuit for producing an output voltage primarily resembling one input signal while retaining the beneficial characteristics of another input signal.

It is another object of the present invention to provide an electrical circuit for mixing dual speed synchro signals to provide an output voltage primarily resembling the coarse or low speed signal while retaining the accuracy and null characteristics of the fine or high speed signal.

It is an additional object of the present invention to provide an electrical circuit for mixing dual speed synchro signals where above a predetermined value one of said signals is provided as an output signal and below said predetermined value the more accurate signal is used solely.

The above objects are accomplished by the present invention in which, for example, coarse and fine synchro signals are connected to first and second circuits respectively. The first circuit includes blocking means for blocking the voltage supplied thereto below a predetermined value and the first circuit forms a feedback loop of the second circuit. The output signal from the second circuit is then dependent upon the predetermined value of the coarse signal. When the value of the coarse signal is below the predetermined value, the coarse signal is blocked and the output from the second circuit is representative of the fine signal. When the coarse signal is above the predetermined value, the coarse signal circuit is effective in the feedback loop of the second circuit to effectively attenuate the fine signal in order that the output signal is the resultant of the coarse and fine signals and incorporates the beneficial characteristics of both.

Referring now to the drawings,

FIG. 1 is a schematic diagram of a servo system embodying the dual speed mixing circuit of the present invention; and FIG. 2 is a graph illustrating the relationship between the fine and coarse input signals and the output signal.

The invention will now be described with respect to a positionable control system, for purposes of simplicity, it being appreciated however that the invention is equally applicable and particularly advantageous where the output signal is utilized for computation purposes.

Referring now to FIG. 1, fine and coarse signals are produced in response to angular displacements of a controlling device 10 which is connected to cause rotation of a shaft 11. Rotatable with the shaft 11 is a rotor 12 which is energized by an alternating current source 13 thereby inducing in a transmitter 14 an electromagnetic field which will assume a position dependent upon the angular position of the rotor 12. This electromagnetic field is reproduced in direction in a receiver unit 16 which is located at some position remote from the transmitter unit 14 and connected thereto by means of leads 15. A rotor 17 is arranged to rotate within the field of the stator of the receiver unit 16 and is positioned in an angular sense by a motor 18 in accordance with the position of its motor shaft 19 as transmitted through shafts 20 and 21 and associated gearing. A controlled object 22 is simultaneously driven by the motor 18 through its shaft 19.

As the purpose of the entire system is to energize the motor 18 to drive its shaft 19 in positional agreement with the controlling device 10, upon the occurrence of a disagreement between the angular position of the shaft 19 and the angular position of the shaft 11, a corresponding angular discrepancy will be evidenced between the rotor 17 which was positioned by the motor 18 and the rotor 12 which was positioned by the controlling device 10. Since the angular position of the rotor 12 is transmitted to the receiver 16, any disagreement between the rotor 17 and the position of the field created by the receiver 16 will serve to create an output signal or voltage, $V_c$, from the rotor 17 that is dependent in amplitude and phase upon the extent and direction respectively of the disagreement between the controlling device 10 and the controlled object 22 which signal is known as the coarse or low speed error or input signal.

In order to provide greater sensitivity, i.e., closer synchronization in the region of small angular disagreements between the position of the controlled object 22 with respect to the controlling device 10, a fine or high speed error or input signal is produced in a conventional manner. The electrical circuit for producing the fine error signal is substantially the same as that for producing the coarse error signal and includes a rotor 26, transmitter 27, transmission lines 28 and a receiver unit 29 including a rotor 31. The fine error signal or voltage, $V_F$, appears at the output of the rotor 31. Rotation of the controlling device 10 produces rotation of the rotor 26 by means of a gear train 34; the gear train 34 produces a rotation of the rotor 26 which is a given multiple N of the rotation of the input shaft 11, for example 36:1. In order to maintain the angular motion of the rotor 31 in the same ratio N with respect to its driving force, i.e., shaft 21, a gear train 35 is provided.

In operation, when there is an angular discrepancy between the input shaft 11 and the motor shaft 19, two error signals are produced. The fine error signal $V_F$ appears on the output lead of the rotor 31 while the coarse error signal $V_C$ appears on the output lead of the rotor 17. Since the A.C. source 13 energizes both of the rotors 12 and 26, both of the error signals will be of the same frequency but due to the ratio of angular displacement of the fine error signal generator as compared to the coarse error signal generator, the cycle of the envelope of the fine error signal will bear a ratio of N:1 to the cycle of the envelope of the coarse error signal.

For small values of actual error, it is desirable to block the coarse error signal from controlling the servomotor 18 since the fine error signal positions the controlled object 22 with respect to the controlling device 10 more accurately with respect to a null condition then the coarse error signal. This value may for example be approximately ±2° of error. In order to have the output signal which energizes the motor 18 resemble the fine error signal within this range while retaining the accuracy and null characteristics of the fine error signal above this value the dual speed synchro mixing circuit of the present invention will now be described.

The rotor 31 is connected through a balancing resistor 40 to an input terminal of an algebraic summing amplifier 41 which in turn has its output terminal connected to the motor 18. The output terminal is also connected in feedback fashion through a feedback resistor 42 to an input terminal of the amplifier 41.

The rotor 17 is connected through a balancing resistor 43 to an input terminal of a summing amplifier 44 which in turn is connected through a blocking circuit 45 to another input terminal of the amplifier 41. The output terminal of the amplifier 41 is connected in feedback fashion through a feedback resistor 46 to an input terminal of the amplifier 44. The blocking circuit 45 may comprise a pair of oppositely poled diodes 50 and 51 which are self biased to block the voltage supplied thereto below a predetermined value and to permit the passage of signals above said predetermined value. Alternatively, the diodes 50 and 51 may be biased from a voltage source as disclosed in the aforementioned U.S. Patent 2,614,237.

In operation, for small discrepancies in the angular relationship of the shaft 11 with respect to the shaft 19 of less than 2° for example, the coarse error signal is less than the predetermined value and the blocking circuit 45 acts as an open circuit. The fine error signal is amplified in the amplifier 41 to energize the motor 18 to accurately position the shaft 19 in a direction and in an amount to eliminate the fine error signal.

For large angular discrepancies where the coarse error signal exceeds the value representative of ±2°, the blocking circuit 45 acts as a closed circuit and the impedance thereof is negligible. This in effect places the coarse error signal circuit consisting of the coarse error signal from the rotor 17, the resistor 43, the amplifier 44, the blocking circuit 45 and the resistor 46 in the feedback path of the fine error signal circuit consisting of the fine error signal from the rotor 31, the resistor 40, the amplifier 41 and the resistor 42. The effect of this is to attenuate the fine error signal because of the high gain of the coarse error circuit being applied in the feedback path of the fine error signal circuit. Further, the output of the amplifier 41 is linear and the transition from one error input signal to another is accomplished smoothly with the output of the amplifier 41 being the resultant of the fine and coarse error signals such that the output signal resembles the coarse error signal while retaining the accuracy and null characteristics of the fine error signal. When the coarse error signal is less than the predetermined value, the output voltage from the amplifier 41 into the motor 18, where $V_0$ is the equivalent to the output voltage, is:

$$V_0 = \frac{R_2}{R_1}\left[\frac{A_1}{1+A_1}\right]V_F$$

where $A_1$ is the gain of the amplifier 41.

If $A_1$ is large, then $$V_0 = \frac{R_2}{R_1}V_F$$

Within the "linear" region of the fine error signal $$V_F = NV_C$$

so that $$V_0 = N\frac{R_2}{R_1}V_C$$

With the coarse error signal exceeding the predetermined value, the output voltage from the amplifier 41 is $$V_0 = \frac{R_4}{R_3}\left[\frac{A_1 A_2}{1+A_1 A_2}\right]V_C + \frac{R_1}{R_2+A_2 R_4}\left[\frac{A_1}{1+A_1 A_2}\right]V_F$$

where $A_2$ is the gain of the amplifier 44.

If $A_1$ and $A_2$ are large, then $$V_0 = \frac{R_4}{R_3}V_C$$

If $$\frac{R_4}{R_3} = N\frac{R_2}{R_1}$$

then the output of the amplifier 41 will be linear, that is the transition from high to low speed synchro operation will be made smoothly. Suitable values have been found to be as follows:

$$A_1 = A_2 = 200$$
$$R_1 = 720K$$
$$R_2 = R_3 = R_4 = 20K$$

The graph of FIGURE 2 illustrates a typical output signal produced by the mixing circuit of the present invention. The coarse error signal $V_C$ appears at A. The fine error signal appears at B. The fine error signal is attenuated so that its gradient near null is the same as that of the coarse error signal. The resultant output signal from the circuit appears at C.

While the invention has been described with respect to a blocking circuit 45 comprising oppositely poled diodes 50 and 51 it will be appreciated that any suitable type of blocking circuit adapted to block a signal below a predetermined value is acceptable.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. In a control system having a controlled object and a controlling object, high speed and low speed transmitters operated from said controlling object, high speed and low speed receivers electrically connected to said high and low speed transmitters respectively and mechanically connected to said controlled object for providing high and low speed signals respectively, a first circuit responsive to said low speed signal, said first circuit including blocking means for blocking the voltage supplied thereto below a predetermined value, and a second circuit responsive to said high speed signal, said first circuit forming a feedback loop of said second circuit when said low speed signal is above said predetermined value whereby for low speed signals below said predetermined value said blocking means is effectively an open circuit and for low speed signals above said predetermined value said blocking circuit is effectively closed, in the latter case said high speed signal is effectively attenuated due to the high gain of said low speed signal in the feedback path of the high speed signal circuit and thus the transition from one speed signal to another is accomplished smoothly.

2. In a control system having a controlled object and a controlling object, high speed and low speed transmitters operated from said controlling object, high speed and low speed receivers electrically connected to said high and low speed transmitters respectively and mechanically connected to said controlled object for providing high and low speed signals respectively, a first circuit responsive to said low speed signal, said first circuit including first amplifying means and blocking means for blocking the voltage supplied thereto below a predetermined value, and a second circuit including second amplifying means responsive to said high speed signal, said first circuit forming a feedback loop of said second circuit when said low speed signal is above said predetermined value whereby for low speed signals below said predetermined value said blocking means is effectively an open circuit and for low speed signals above said predetermined value said blocking circuit is effectively closed, in the latter case said high speed signal is effectively attenuated due to the high gain of said low speed signal in the feedback path of the high speed signal circuit and thus the transition from one speed signal to another is accomplished smoothly.

3. In a system for mixing two voltages, first signal generating means for providing a first signal, second signal generating means for providing a second signal, first summing and amplifying means responsive to said first signal and having input and output connections, an output connection of said first amplifying means being connected to an input connection thereof in feedback fashion, second amplifying means responsive to said second signal and having input and output connections, blocking means blocking the voltage supplied thereto below a predetermined value, means connecting said blocking means between an output connection of said second amplifying means and an input connection of said first amplifying means, and means connecting an output connection of said first amplifying means in feedback fashion to an input connection of said second amplifying means whereby below said predetermined value said first signal is effective and above said predetermined value said second signal is effective and smooth transition from one effective signal to another is accomplished.

4. In a system as claimed in claim 3 wherein said blocking means includes a pair of diodes having a fixed bias.

5. In a system for mixing fine and coarse signal voltages, fine signal transmission means for providing a fine signal, coarse signal transmission means for providing a coarse signal, first algebraic summing and amplifying means having an input terminal connected to be responsive to said fine signal and an output terminal, a first feedback connection connecting said output terminal to an input terminal of said first amplifying means, second amplifying means having an input terminal connected to be responsive to said coarse signal and an output terminal, blocking means connected between the output terminal of said second amplifying means and an input terminal of said first amplifying means for blocking voltage supplied thereto below a predetermined value, and means connecting the output terminal of said first amplifying means in feedback fashion to an input terminal of said second amplifying means.

References Cited in the file of this patent
UNITED STATES PATENTS
2,560,337     Fouassin _____ July 10, 1951